(12) United States Patent
Abe

(10) Patent No.: US 10,200,674 B2
(45) Date of Patent: Feb. 5, 2019

(54) IMAGE PROCESSING APPARATUS, IMAGE CAPTURING APPARATUS, AND RECORDING MEDIUM

(71) Applicant: CANON KABUSHIKI KAISHA, Tokyo (JP)

(72) Inventor: Takahiro Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 15/404,737

(22) Filed: Jan. 12, 2017

(65) Prior Publication Data

US 2017/0208316 A1 Jul. 20, 2017

(30) Foreign Application Priority Data

Jan. 14, 2016 (JP) .................. 2016-005470

(51) Int. Cl.
| | |
|---|---|
| *H04N 13/239* | (2018.01) |
| *G06T 7/571* | (2017.01) |
| *G06T 7/246* | (2017.01) |
| *G06K 9/62* | (2006.01) |
| *G06T 11/60* | (2006.01) |
| *H04N 5/345* | (2011.01) |
| *G06T 5/00* | (2006.01) |
| *G06T 7/00* | (2017.01) |

(Continued)

(52) U.S. Cl.
CPC .......... *H04N 13/239* (2018.05); *G06K 9/623* (2013.01); *G06T 5/003* (2013.01); *G06T 7/0002* (2013.01); *G06T 7/248* (2017.01); *G06T 7/571* (2017.01); *G06T 11/60* (2013.01); *H04N 5/23212* (2013.01); *H04N 5/345* (2013.01); *H04N 5/3696* (2013.01); *G06T 2207/10012* (2013.01); *G06T 2207/10028* (2013.01); *G06T 2207/20221* (2013.01); *G06T 2207/30168* (2013.01); *H04N 2013/0085* (2013.01)

(58) Field of Classification Search
None
See application file for complete search history.

(56) References Cited

U.S. PATENT DOCUMENTS

2014/0043523 A1* 2/2014 Yamazaki .......... H04N 5/23212
348/352
2014/0307134 A1* 10/2014 Kanda ................ H04N 5/23212
348/280

FOREIGN PATENT DOCUMENTS

JP 2001-083407 A 3/2001
JP 2013-068759 A 4/2013

* cited by examiner

*Primary Examiner* — Eileen M Adams
(74) *Attorney, Agent, or Firm* — Cowan, Liebowitz & Latman, P.C.

(57) ABSTRACT

An image processing apparatus processes an image obtained by an image capturing apparatus that includes a plurality of first photoelectric converters and a plurality of second photoelectric converters each forming a pair with each other. The second photoelectric converters providing a signal that has a parallax for a signal from the corresponding one of the first photoelectric converters, and a signal reading unit configured to read a first signal as an output signal from the first photoelectric converter and to read a second signal as a combination signal of the first signal and an output signal from a paired one of the second photoelectric converters in image capturing in which the first and second photoelectric converters receive light from an object. The image processing apparatus includes a defocus amount calculating unit configured to calculate a defocus amount using the first signal and the second signal.

12 Claims, 14 Drawing Sheets

(51) Int. Cl.
*H04N 5/232* (2006.01)
*H04N 5/369* (2011.01)
*H04N 13/00* (2018.01)

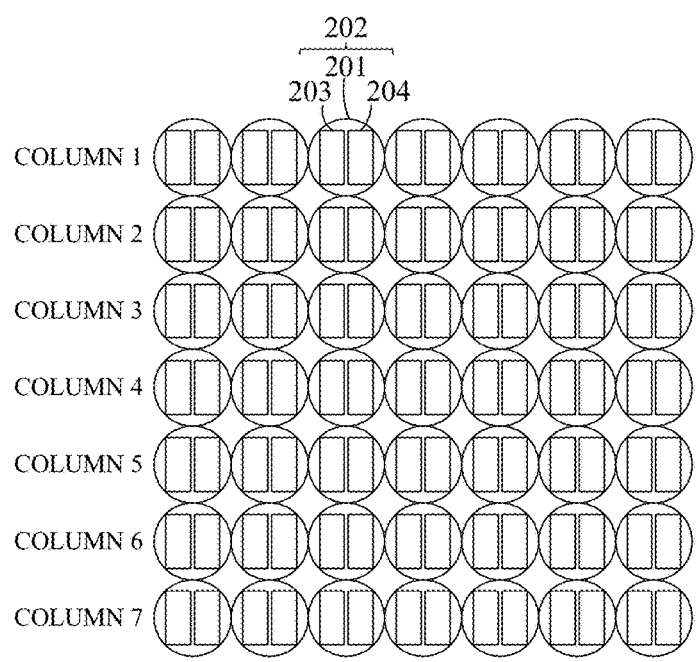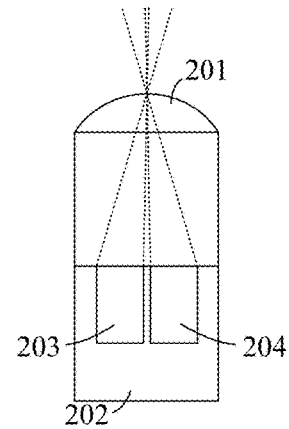
FIG. 2A
FIG. 2B

○ ADDITION READING
◐ INDEPENDENT READING
▤ READ PIXEL
▨ AREA FROM WHICH PARALLAX IMAGES (A AND B IMAGES) HAVE BEEN ACQUIRED
▦ B IMAGE CALCULATED BY SUBTRACTING A IMAGE FROM A+B IMAGE

IMAGE PROCESSING APPARATUS, IMAGE CAPTURING APPARATUS, AND RECORDING MEDIUM

BACKGROUND OF THE INVENTION

Field of the Invention

The present invention relates to an image processing technology for calculating a defocus amount that is a difference between an imaging plane of an image capturing optical system and an imaging plane in an image capturing apparatus.

Description of the Related Art

An image capturing apparatus, such as a digital still camera, acquires a plurality of parallax images having parallaxes by capturing an object at mutually different viewpoints, and calculates a defocus amount using the parallaxes among the plurality of parallax images.

Japanese Patent Laid-Open No. ("JP") 2001-083407 discloses an image capturing apparatus that includes an image sensor in which each of a plurality of pixels has one micro lens and a plurality of (two) photoelectric converters, and the plurality of photoelectric converters in each pixel are configured to receive light fluxes that have passed different areas in a pupil in an image capturing optical system. This image capturing apparatus calculates an image shift amount (phase difference) between a pair of signals obtained from the two photoelectric converters in each of the plurality of pixels, and calculates a defocus amount based on the image shift amount. The image capturing apparatus disclosed in JP 2001-083407 reads signals separately from the two photoelectric converters for each pixel, and needs a time period to read the signal for one pixel twice as long as that required to read the signal from one photoelectric converter.

JP 2013-068759 discloses an image capturing apparatus that can provide addition reading and independent reading of the signals from two photoelectric converters in each pixel. This image capturing apparatus acquires a pair of signals by independently reading a signal from each of the two photoelectric converters only for in pixels arranged at a predetermined arrangement period in calculating the image shift amount between the pair of signals. This configuration can calculate an image shift amount while restraining a signal readout time period from increasing. In addition, the image capturing apparatus disclosed in JP 2013-068759 obtains a pair of signals having a resolution higher than that of the independent reading in each frame by changing the independent reading pixel row for each frame in motion image capturing.

However, JP 2013-068759 is silent about the way of calculating the image shift amount or the defocus amount using the pair of image signals obtained by changing the independent reading pixel row for each frame in the motion image capturing. In addition, the image capturing apparatus disclosed in JP 2013-068759 may calculate the defocus amount less precisely as in capturing the moving object or in hand vibrations in hand-held image capturing.

SUMMARY OF THE INVENTION

The present invention provides an image processing apparatus that can more quickly read a signal for calculating a defocus amount and precisely calculate a defocus amount in an image capturing apparatus that can provide independent reading and addition reading from a plurality of photoelectric converters. The present invention provides an image capturing apparatus having the above image processing apparatus.

An image processing apparatus according to one aspect of the present invention is configured to process an image obtained by an image capturing apparatus. The image capturing apparatus includes a plurality of first photoelectric converters and a plurality of second photoelectric converters, each second photoelectric converter forming a pair with a corresponding one of the first photoelectric converters, the second photoelectric converters being arranged so as to provide a signal that has a parallax for a signal from the corresponding one of the first photoelectric converters, and a signal reading unit configured to read a first signal as an output signal from the first photoelectric converter and to read a second signal as a combination signal of the first signal and an output signal from a paired one of the second photoelectric converters in image capturing in which the first and second photoelectric converters receive light from an object. The image processing apparatus includes a defocus amount calculating unit configured to calculate a defocus amount using the first signal and the second signal.

Further features of the present invention will become apparent from the following description of exemplary embodiments with reference to the attached drawings.

BRIEF DESCRIPTION OF THE DRAWINGS

FIGS. 2A and 2B are views each illustrating a configuration of a pupil division type image sensor according to the first embodiment.

DESCRIPTION OF THE EMBODIMENTS

Referring now to the accompanying drawings, a description will be given of the embodiments of the present invention.

First Embodiment

Figure 1:
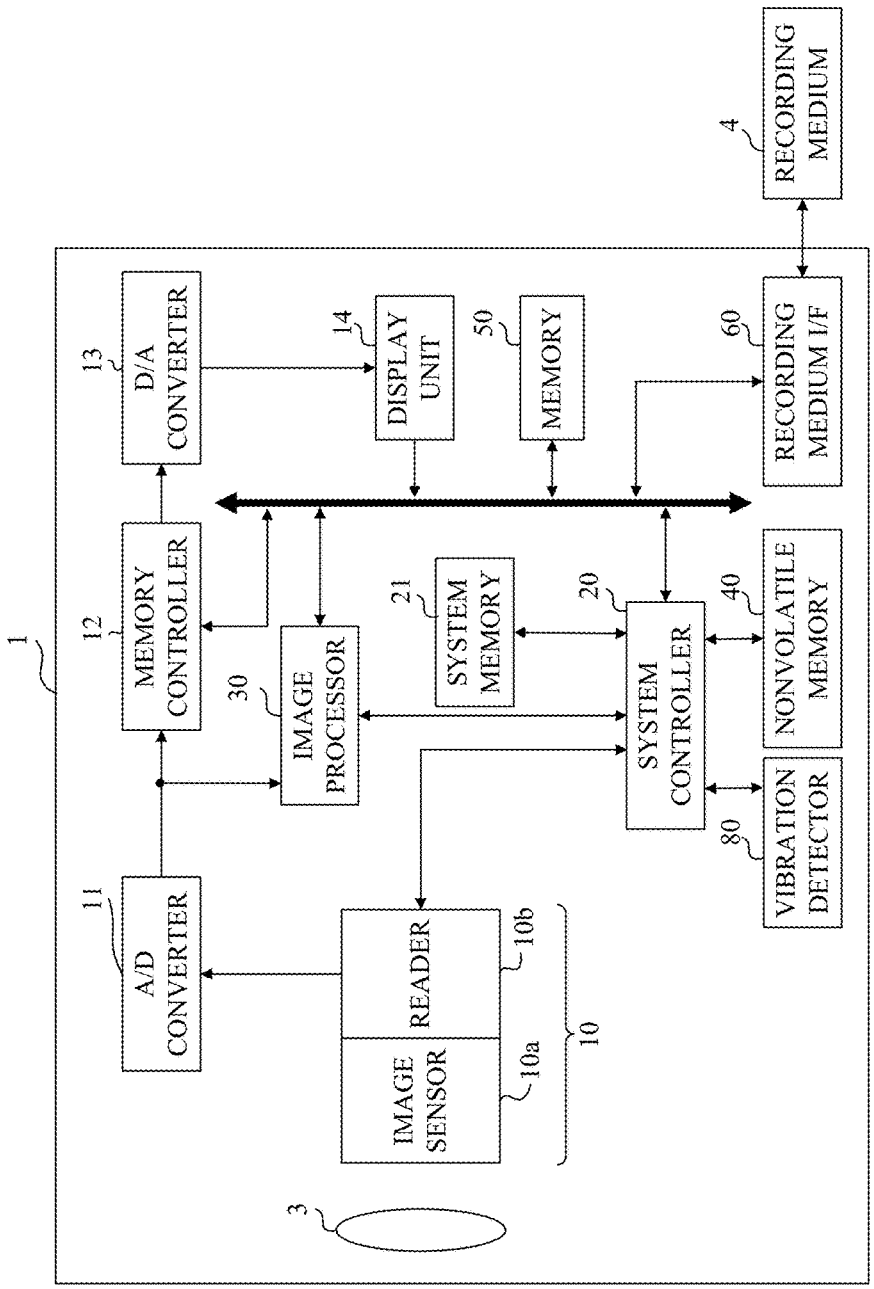
FIG. 1 is a view of a configuration of a digital camera according to a first embodiment of the present invention.

A description will be given of a first embodiment according to the present invention. FIG. 1 illustrates a configuration of a digital camera 1 as an image capturing apparatus that includes an image processing apparatus according to this embodiment. An image capturing lens 3 as an image capturing optical system includes a magnification-varying lens, an aperture stop, and a focus lens, and forms an object image (optical image). An image capturing unit 10 includes an image sensor 10a configured to convert an object image into an electric signal, and a reader (signal reading unit) 10b as a circuit for reading the signal from the image sensor 10a. The image sensor 10a is a two-dimensional image sensor, such as a CCD sensor and a CMOS sensor.

FIGS. 2A and 2B illustrate a configuration of the image sensor 10a. The image sensor has a plurality of imaging pixels in a two-dimensional arrangement as illustrated in FIG. 2A. FIG. 2A illustrates a 7 columns×7 rows imaging pixel area (with column 1 to column 7 from the top) in the image sensor 10a viewed from the side of the image capturing lens 3.

These imaging pixels have color filters in a Bayer arrangement. More specifically, green (G) and red (R) color filters are alternately provided in order from the left on the imaging pixels on the odd columns, and blue (B) and green (G) color filters are alternately provided in order from the left on the imaging pixels on the even columns in FIG. 2A.

FIG. 2B illustrates an enlarged sectional structure of one certain imaging pixel 202. The imaging pixel 202 includes one micro lens 201, a pair of photoelectric converters (a first photoelectric converter and a second photoelectric converter) 203 and 204 configured to receive and convert incident light from the micro lens 201 into the electric signal (analog signal). The pair of photoelectric converters 203 and 204 are arranged in the horizontal direction (column direction) so as to have a parallax in the horizontal direction.

The pair of photoelectric converters 203 and 204 are conjugate with the exit pupil in the image capturing lens 3 via the common micro lens 201. The photoelectric converter 203 receives a light flux that has passed part of the area in the exit pupil (referred to as a "pupil region" hereinafter), and the photoelectric converter 204 receives a light flux that has passed another part of the area in the exit pupil. Since the different photoelectric converts 203 and 204 receive the light fluxes that have passed mutually different pupil regions, two images generated using signals read out of the photoelectric converters 203 and 204 are a pair of parallax images having a parallax. When the light from the object is simultaneously received and imaged by the photoelectric converters 203 and 204, the object can be captured at mutually different viewpoints at the same time.

In this embodiment, an output signal read out of the photoelectric converter 203 by the reader 10b will be referred to as an "A image signal (first output signal)," and an image generated with the A image signal will be referred to as an "A image (first image signal)." An output signal read out of the photoelectric converter 204 by the reader 10b will be referred to as a "B image signal," and an image generated with the B image signal will be referred to as a "B image (second image signal)." When the A image signal and the B image signal are combined (e.g. added) and read out, an image signal used to generate a normal image signal is generated.

in the following description, a signal read as an addition of the A image signal and the B image signal will be referred to as an "A+B image signal (second output signal)," and an image generated with the A+B image signal from the plurality of imaging pixels will be referred to as an "A+B image."

While one imaging pixel in this embodiment contains two photoelectric converters arranged in the horizontal direction, an arrangement direction of the photoelectric converters in one imaging pixel may be a vertical direction (row direction) or the number of photoelectric converters may be four or another number other than two.

The reader 10b can provide independent reading configured to independently read the A image signal and the B image signal, and addition reading configured to read the A+B image signal.

The A/D converter 11 converts an analog signal (A+B image signal and A image signal) output from the image capturing unit 10 (reader 10b) into a digital signal, and outputs the digital signal to the image processor 30.

The image processor 30 as an image processing apparatus provides an image generation process configured to generate image data (A image, A+B image, and B image) using the digital image from the A/D converter 11. The image processor 30 performs a pixel interpolation, a resize process, a color conversion process, etc. for the generated image data and the image data from the memory controller 12, which will be described later. The image processor 30 performs a frame interpolation process, a defocus amount calculation process, etc., which will be described later, using the A+B image and the A image. The image processor 30 includes an image processing computer, and performs the above processes in accordance with a computer program. The image processor 30 performs a predetermined calculation process using image data, and outputs the obtained calculation result to the system controller 20. The image processor 30 serves as an image generating unit and a defocus amount calculating unit.

The system controller 20 performs an AE (auto exposure) control, an AF (autofocus) control, an AWB (auto white balance) process, etc. using a calculation result by the image processor 30. The image data from the A/D converter 11 is written in the memory 50 via the image processor 30 and the memory controller 12. The memory 50 stores image data from the A/D converter 11, and stores displaying image data on the display unit 14. The memory 50 can store still image data for the predetermined number of still images, motion image data and audio data for a predetermined time period.

A D/A converter 13 converts the displaying image data stored in the memory 50 into the analog signal, and supplies it to the display unit 14. The display unit 14 displays the image corresponding to the displaying image data written in the memory 50.

A nonvolatile memory 40 is an electrically erasable and recordable memory, and includes an EEPROM etc. The nonvolatile memory 40 stores a constant for use with operations of the system controller 20, a computer program, etc.

The system controller 20 includes a microcomputer, and controls an operation of the entire digital camera 1 in accordance with a system control program as a computer program stored in the nonvolatile memory 40. A system memory 21 includes a RAM, stores a constant and variable for operations of the system controller 20, and a developed computer program read out of the nonvolatile memory 40.

A recording medium 4 includes a semiconductor memory and a magnetic disc, and records an image (still image and motion image). A recording medium interface (I/F) 60 is an interface with the recording medium 4 for the image data.

A vibration detector 80 includes a gyro sensor (angular velocity detector) and an acceleration sensor, and detects a vibration, such as a hand vibration, applied to the digital camera 1. The system controller 20 calculates a vibration amount of the digital camera 1 using the detection signal (vibration information) from the vibration detector 80. The system controller 20 provides an image stabilization process for reducing an image blur by shifting a shift lens in the image capturing lens 3 or the image sensor 10a in the direction orthogonal to the image capturing optical axis based on the calculated vibration amount or by shifting a cut area from the frame image in the motion image.

Next follows a detailed description of each process performed by the image processor 30. The image processor 30 compares a plurality of continuous frame images (moving object detected image) with one another, generated from sequentially read signals at a predetermined period from the image sensor 10a through the reader 10b, and detects an area that contains the moving object in each frame image. In other words, the image processor 30 serves as a moving object detecting unit. The moving object detection process can use a method for searching a specific moving object for each frame image through pattern matching and for detecting its positional change. Another method can use a method for detecting a moving object based on a change of an image difference value between corresponding pixel blocks or corresponding pixels among the plurality of pixel blocks or pixels provided in each of the plurality of frame images.

The image processor 30 can provide an image signal generation process for subtracting the A image signal acquired through the independent reading from the A+B image signal acquired by the addition recording from the image sensor 10a by the reader 10b, and for generating the B image signal as a difference signal. The A image and the B image generated based on the thus obtained A and B image signals correspond to a pair of parallax images. When each of the A image signal and the B image signal are read out of all pixels in the image sensor 10a through the independent reading, it takes a long time to read signals from all pixels. On the other hand, when the A image signal is read out of only the area used to generate the parallax image (partial parallax image, which will be described later) from each of the A image signal and the B image signal and the B image signal is obtained by subtracting the A image signal from the A+B image signal, a signal reading time period can become shorter.

While this embodiment generates the B image signal by subtracting the A image signal from the A+B image signal, the A image signal may be generated by subtracting the B image signal (first output signal) from the A+B image signal (second output, signal).

The image processor 30 calculates a relative image shift amount (phase difference) between the A image and the B image through the correlation calculation, and performs a defocus amount calculation process for calculating the defocus amount of the image capturing lens 3 using the image shift amount. More specifically, the image processor 30 calculates a correlation value C(k) representing a coincidence between a pair of parallax images through a correlation calculation (SAD: Sum of Absolute Difference) as in the expression (1) to pixels An ($A_1$ to $A_N$) in the A image and pixels $B_N$ ($B_1$ to $B_N$) in the B image.

$$C(k)=\Sigma|A_n-B_{n+k}| \quad (1)$$

In the expression (1), $\Sigma$ represents an accumulated calculation (summation calculation) for a variable n. A range of the variable n is limited to a range in which data $A_n$ and $B_{n+k}$ exist in accordance with an image shift amount k. The image shift amount k is an integer or a relative shift amount having a unit of a data interval in the pair of data rows corresponding to the pair of parallax image signal rows.

Figure 14:
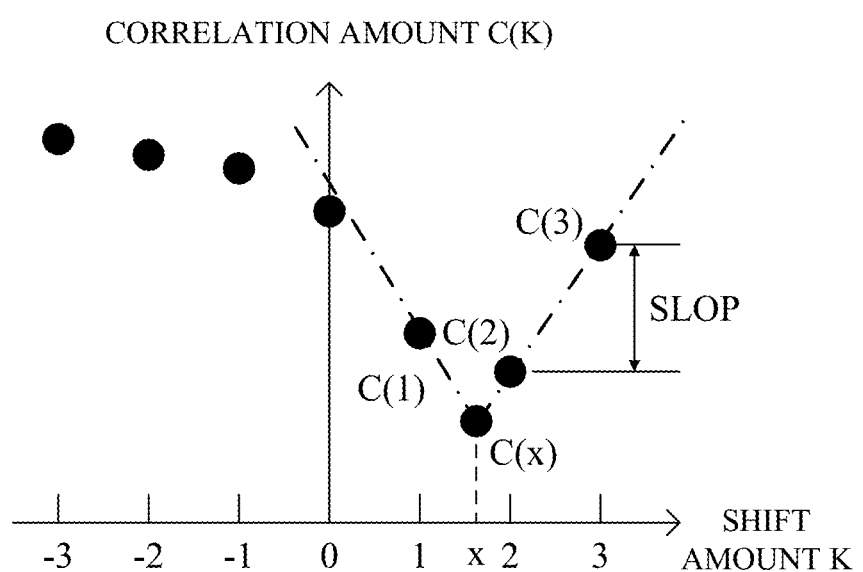
FIG. 14 is a view of a phase difference calculation according to each embodiment.

The correlation value C(k) calculated by the expression (1) becomes smaller as the correlation degree or the coincidence in the pair of data rows is higher, as illustrated in FIG. 14. FIG. 14 illustrates an example where for the image shift amount k (integer) as $k_j$ of 2, the correlation value C(k) becomes smallest and the coincidence between the pair of parallax images becomes highest. Since the image shift amount k is an integer, the calculated correlation value C(k) is a discrete value. The image shift amount x that provides a minimum value C(x) in the continuous correlation values can be calculated based on the three-point interpolation method with the following expressions (2) to (5).

$$x=k_j+D/\text{SLOP} \quad (2)$$

$$C(x)=C(k_j)-|D| \quad (3)$$

$$D=\{C(k_{j-1})-C(k_{j+1})\}/2 \quad (4)$$

$$\text{SLOP}=\text{MAX}\{C(k_{j+1})-C(k_j),C(k_{j-1})-C(k_j)\} \quad (5)$$

Next, the image processor 30 calculates a defocus amount DEF of the image capturing lens 3 using the image shift amount x calculated through the correlation calculation and the following expression (6).

$$\text{DEF}=KX\cdot PY\cdot x \quad (6)$$

In the expression (6), PY denotes a pixel pitch in the image sensor 10a (distance between the imaging pixels in the image sensor 10a), and KX denotes a conversion coefficient with a unit of mm/pixel determined by a magnitude of an open angle of the center of gravity of the light fluxes that pass the pair of pupil regions. The magnitude of the open angle of the center of gravity of the light fluxes that pass the pair of pupil regions is determined in accordance with the magnitude (F-number) of the aperture stop in the image capturing lens 3.

A defocus map representing the defocus amount distribution corresponding to the objects in both parallax images can be generated by calculating the defocus amount in each target pixel by shifting one pixel by one pixel the target pixel used to calculate the defocus amount in the pair of parallax images. This embodiment generates and uses the defocus map, but may generate and use an image shift amount map representing a relative image shift amount between the A image and the B image, and a distance map representing the object distance that can be calculated from the image shift amount.

The image processor 30 performs the following frame interpolation process before the defocus amount calculation process. In this embodiment, in one frame, the reader 10b reads the A+B image signal through addition reading from all imaging pixels in the image sensor 10a, and reads the A image signal through independent reading from part of a plurality of imaging pixels (referred to as "partial imaging pixels" hereinafter) among all imaging pixels.

Moreover, the image processor 30 subtracts the A image signal of the partial imaging pixel from the A+B image signal corresponding to the partial imaging pixel in the A+B image signal in all imaging pixel. Thereby, the image processor 30 obtains the B signal from the same partial imaging pixel as that used to obtain the A image signal. The image processor 30 generates the A image (first image signal: referred to as a "partial A image" hereinafter) and the B image (second image, signal: referred to as a "partial B image" hereinafter) based on the A image signal and the B image signal from the same partial imaging pixel, These partial A image and partial B image are a pair of partial parallax images having a parallax obtained by capturing the same part of the object at mutually different viewpoints.

In this embodiment, the image processor 30 obtains the partial A image and the partial B image in, a plurality of imaging pixel columns spaced in the row direction in one frame, This embodiment periodically (cyclically) changes an imaging pixel column (or partial imaging pixel column that contains specific photoelectric converter group: referred to as a "partial, reading column" hereinafter) used to obtain the partial A image and the partial B image among a plurality of frames.

Figure 4A:
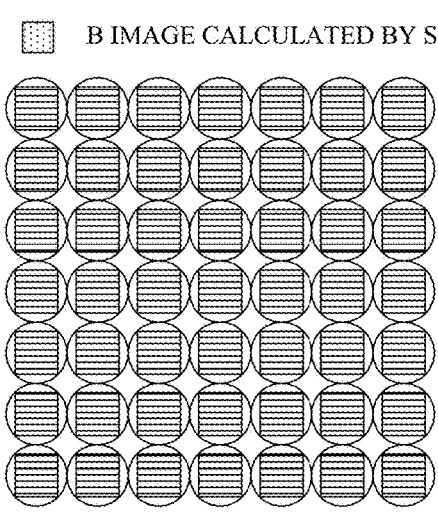
FIGS. 4A to 4D are views of illustrative addition reading and independent reading according to the first embodiment.

FIGS. 4A to 4D illustrate illustrative imaging pixels for the addition reading and imaging pixels for the independent reading in the 7 columns×7 rows imaging pixel area in the image sensor 10a. FIG. 4A illustrates imaging pixels for the addition reading of the A+B image signal with lateral hatching. In the following description, generating the B image signal by subtracting the A image signal from the A+B signal will be referred to as generating the B image by subtracting the A image from the A+B image.

Figure 4B:
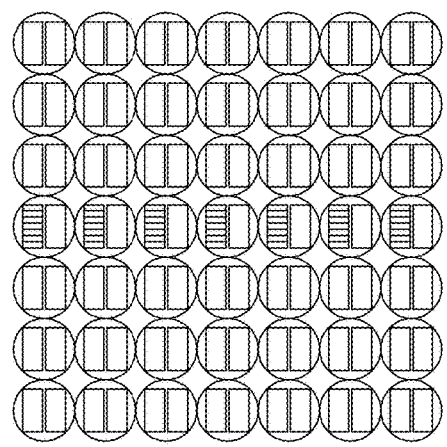
Figure 4C:
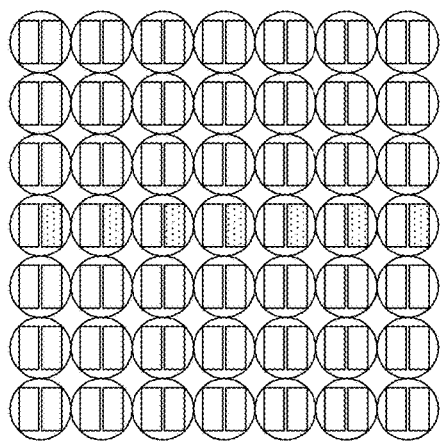
Figure 4D:
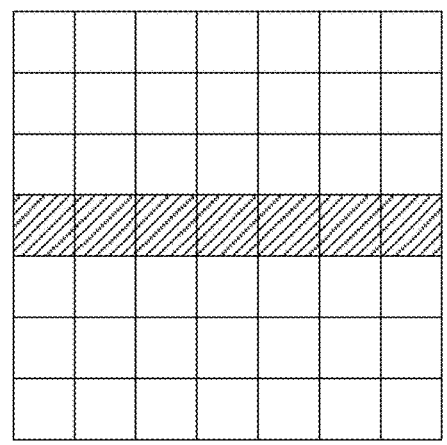
Figure 5A:
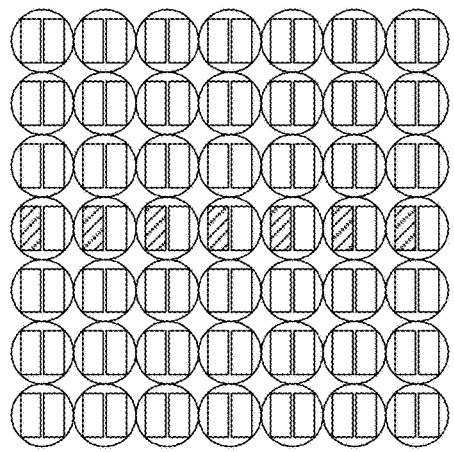
FIGS. 5A to 5D are views of an illustrative operation of the independent reading by periodically changing a partial reading column among a plurality of frames according to the first embodiment.
Figure 5B:
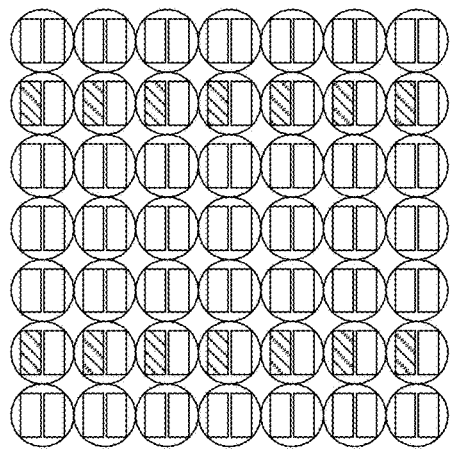
Figure 5C:
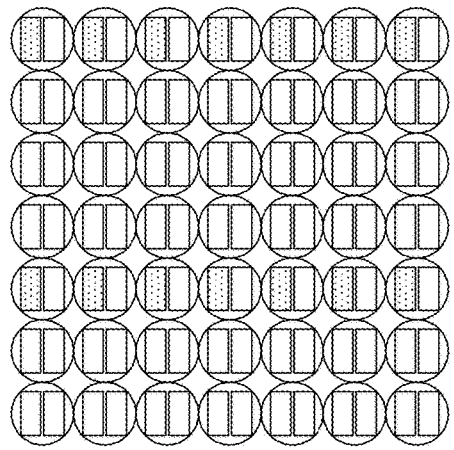
Figure 5D:
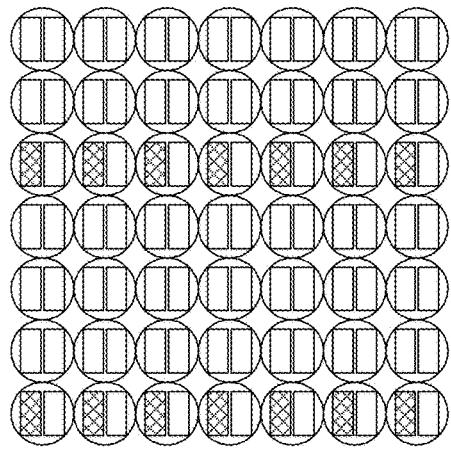

FIG. 4B illustrates one of the photoelectric converters (203) in each imaging pixel contained in the partial reading column for the independent reading of the A image signal with lateral hatching. The partial B image becomes equivalent with the partial B image originally obtained from the other of the photoelectric converters (204), which is represented by dotted hatching among the imaging pixels at the partial reading column as illustrated in FIG. 4C. In other words, the pair of partial parallax images (partial A image and partial B image) can be obtained in a bevel hatched partial reading column in FIG. 4D that illustrates each imaging pixel with a simple square shape.

Referring now to the flowchart in FIG. 3, a description will be given of a flow from the process performed by the system controller 20 to the frame interpolation process and the focus detection process performed by the image processor 30. Each of the system controller 20 and the image processor 30 executes the process in accordance with the focus detection program contained in the system control program and the image process program.

In the step S100, the system controller 20 determines whether an unillustrated motion image recording start button is pressed by the user operation. When the motion image recording start button is pressed, the flow moves to the step S101, and when the motion recording start button is not pressed, this step repeats the determination.

In the step S101, the system controller 20 starts the AF process, the AE process, the AWB process, etc.

Next, in the step S102, the image processor 30 generates the A+B image (referred to as an "entire A+B image" hereinafter) from the A+B image signal additionally read out of all imaging pixels in the image sensor 10a by the reader 10b. In addition, the image processor 30 generates the partial A image from the A image signal independently read out of the partial reading column in the image sensor 10a. The image processor 30 temporarily stores the entire A+B image as one frame image in the memory 50, and the partial A image in the memory 50.

This embodiment sets to four, the number of frames in one period in which the partial A image can be obtained in the entire imaging pixel range by changing the partial reading column, as illustrated in the 7 columns×7 rows imaging pixel area in FIGS. 5A to 5D. In other words, four partial A images are obtained from the mutually different partial reading columns by capturing images four times (a plurality of times) at different time while changing partial reading column in one period. In addition, this embodiment obtains, through the frame interpolation process, the A image (third image: referred to as an "entire interpolated A image" hereinafter) corresponding to the entire A image as a single image originally obtainable from the photoelectric converter 203 using all imaging pixels. Similarly, this embodiment obtains, through the frame interpolation process after four partial B images are obtained in one period, the B image (fourth image: referred to as an "entire interpolated B image" hereinafter) corresponding to the entire B image as a single image originally obtainable from the photoelectric converter 204 using all imaging pixels.

In this step S102, the image processor 30 subtracts the partial A image from the partial A+B image in the partial reading column in the entire A+B image obtained in the step S102, and obtains the partial B image paired with the partial A image. The image processor 30 temporally stores the thus obtained partial B image in the memory 50.

Next, in the step S103, the image processor sets the A image to a target for the frame interpolation process, and moves to the step S104.

In the step S104, the image processor 30 performs the frame interpolation process for the partial A image, and moves to the step S105. A detailed description of the frame interpolation process for the partial A image will be given later.

In the step S105, the system controller 20 sets the B image to a target for the frame interpolation process, and moves to the step S016.

In the step S106, the image processor 30 performs the frame interpolation process for the partial B image, and moves to the step S107. A detailed description of the frame interpolation process for the partial B image will be given with a description of the frame interpolation process for the A image.

In the step S107, the image processor 30 determines whether the partial A image and the partial B image for four frames in one period have been completely acquired. When the acquisition has been completed, the flow moves to the step S108, and when the acquisition has not yet been completed, the flow returns to the step S101 so as to acquire the entire A+B image, the partial A image, and the partial B image in the next frame.

In the step S108, the image processor calculates, based on the expressions (1) to (5), an image shift amount x between the entire interpolated A image generated by the frame interpolation process in the step S104 and the entire interpolated B image generated by the frame interpolation process in the step S106. The target pixel used to calculate the image shift amount is determined in accordance with the resolution and the number of pixels in the defocus map generated in the next step S109.

In the step S109, the image processor 30 calculates a defocus amount DEF based on the expression (6) with the image shift amount between the entire interpolated A image and the entire interpolated B image. The defocus map is generated by calculating the defocus amount for all target pixels. The defocus amount and the defocus map are used for the AF control and another process by the system controller 20.

Once the partial A image and the partial B image for four frames (the entire image) are completely acquired in the step S107, the defocus map can be generated for each frame by updating only newly acquired the partial A image and partial B image. This is applied to the second embodiment, which will be described later.

In the step S110, the system controller 20 determines whether a motion image recording end button has been pressed. When the motion image recording end button has not yet been pressed, the flow returns to the step S101. When the motion image recording end button has been pressed, the system controller 20 ends this process.

Figure 6:
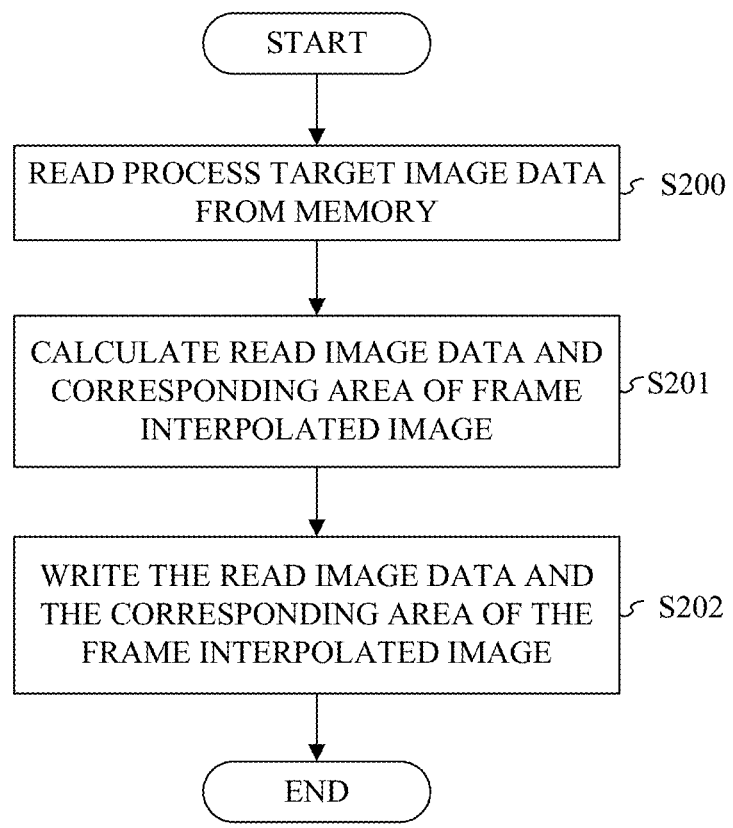
FIG. 6 is a flowchart illustrating a frame interpolation process to signals read out of a plurality of partial reading columns according to the first embodiment.

A detailed description will be given of the frame interpolation process performed in the steps S104 and S106, with reference to a flowchart in FIG. 6.

In the step S200, the image processor 30 reads the image data (partial A image or partial B image, or referred to as an "interpolation target image" hereinafter) that is the target for the frame interpolation process from the memory 50.

Next, in the step S201, the image processor 30 calculates a pixel column (referred to as a "write area" hereinafter) as a corresponding area in the frame interpolation image to the interpolation target image read in the step S200. The frame interpolation image becomes the entire interpolated A image or the entire interpolated B image corresponding to the single image when the partial A image or the partial B image is written in the entire write area.

In the step S202, the signal processor 30 writes the interpolated target image read in the step S200 in the write area in the frame interpolation image calculated in the step S201. Thereby, the frame interpolation process once ends.

When this frame interpolation process is performed four times each (for four frames) in each of the steps S104 and S106, the entire interpolated A image and the entire interpolated B image are obtained as a pair of frame interpolated images.

FIGS. 7A to 7H illustrate illustrative frame interpolation processes. FIGS. 7A to 7H illustrate 5 columns×5 rows image areas. FIGS. 7A to 7H illustrate the partial reading column from which the A image signal has been read with bevel, dot, mesh hatching, so as to generate the partial A image at each of the eight frames 1 to 8 used to acquire the frame images at regular time intervals. A hatching type is made different for each frame. The partial B image corresponding to this partial reading column is generated by subtracting the partial A image from the partial A+B image at the partial reading column.

FIGS. 7I to 7P illustrate the frame interpolated image corresponding to the A image. The frame interpolated image for the B image are similarly generated. Since this embodiment sets four frames to one period and changes the partial reading column for each frame, the partial A image is completely written in the entire write area in the frame interpolated image at frame 4 illustrated in FIG. 7L.

Figure 7:
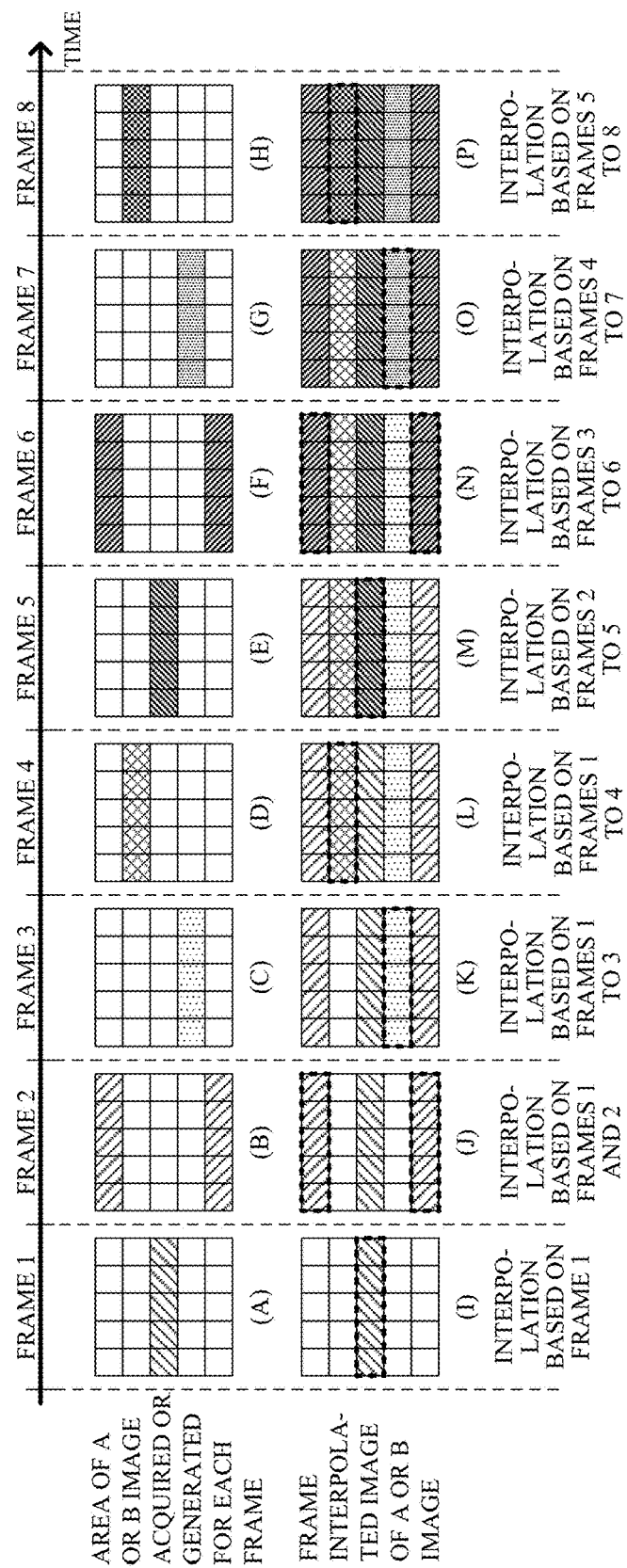
FIG. 7 is a view illustrating an illustrative frame interpolation process according to the first embodiment.
Figure 8A:
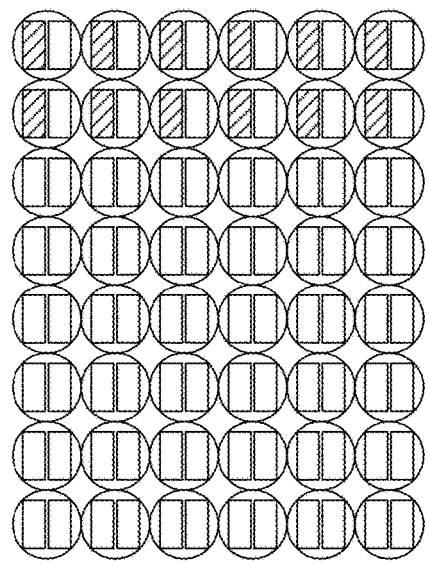
FIGS. 8A to 8D are views of another illustrative operation of the independent reading by periodically changing a partial reading column according to the first embodiment.
Figure 8B:
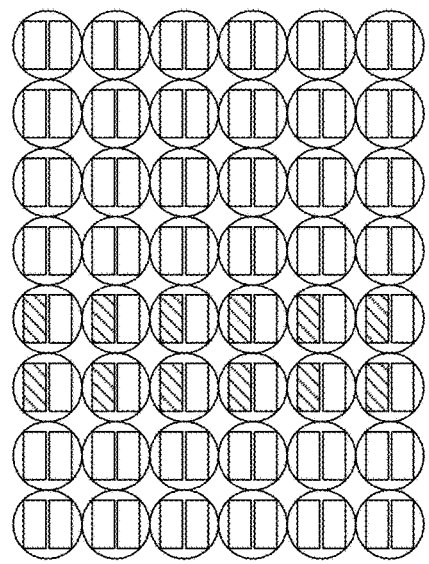
Figure 8C:
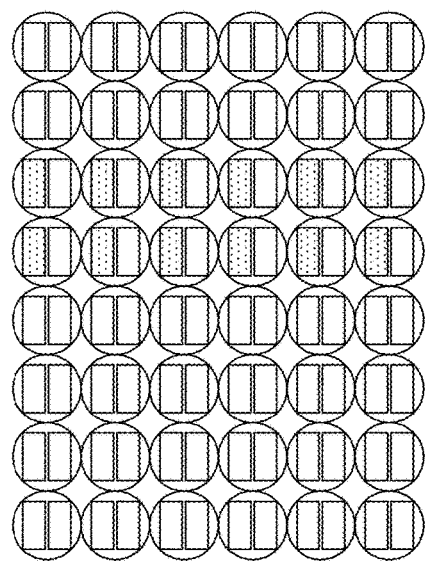
Figure 8D:
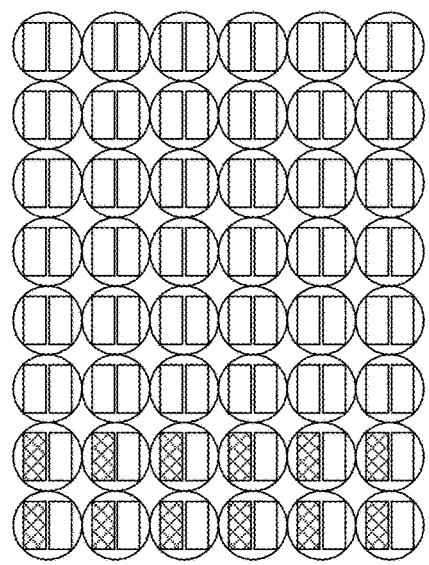

The partial A image newly acquired at frame 5 is overwritten on the write area in which the partial A image has been written at the frame 1 in the frame interpolated image illustrated in FIG. 7L, at the frame 5 illustrated in FIG. 7M. Thus, the frame interpolated image for the A image is updated while the four write areas in the frame interpolated image are overwritten with the new partial A image for each one frame. The frame interpolated image for the B image is similarly updated.

Figure 3:
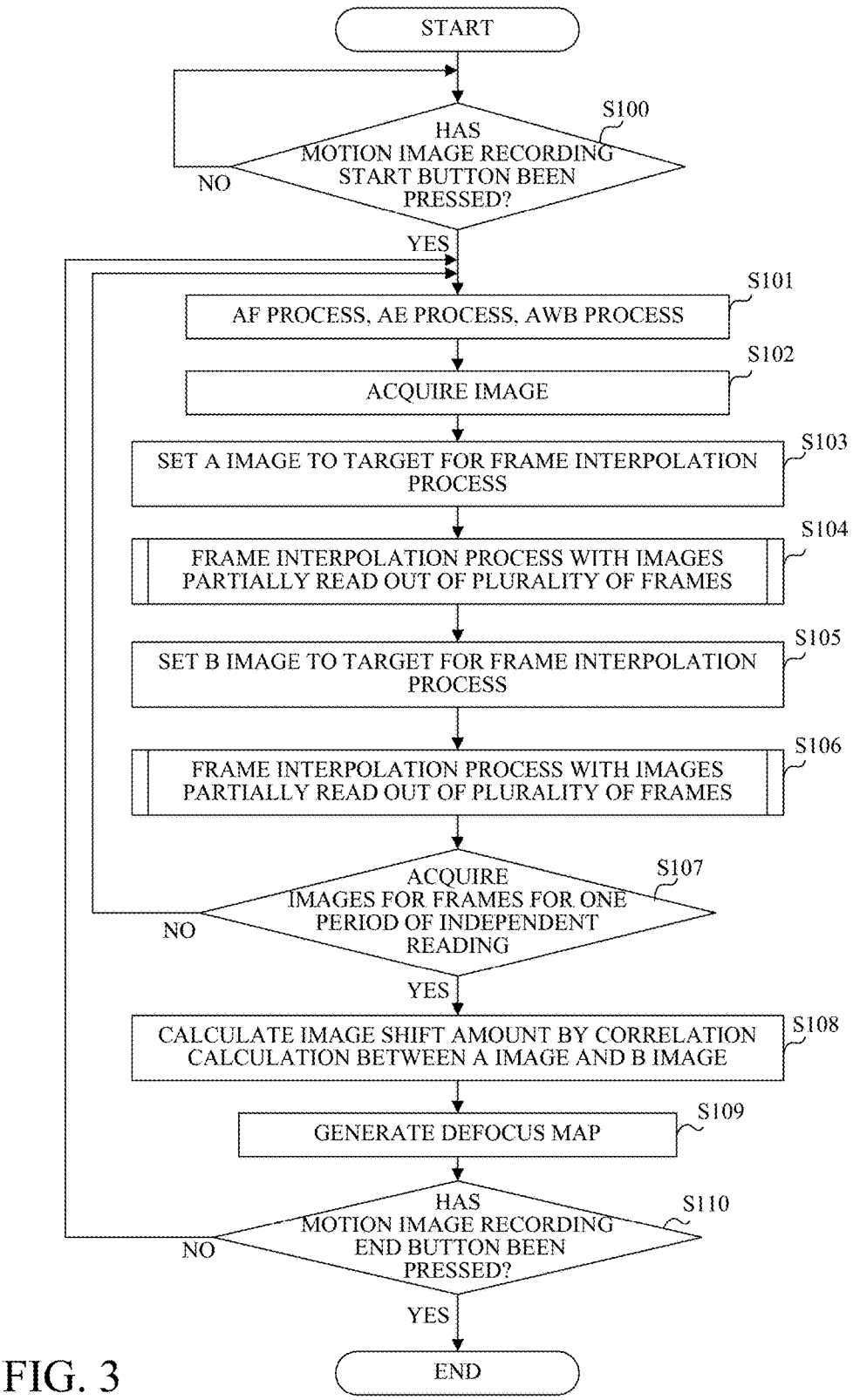
FIG. 3 is a flowchart illustrating a defocus amount calculation process according to the first embodiment.

After data for the four frames (for one period) is accumulated, a pair of sequentially updated frame interpolated images or a pair of parallax images are used to calculate the defocus amount in the step S108 in FIG. 3 every one frame.

This embodiment can more quickly complete reading signals in comparison with reading of the A+B image signal and the A image signal from all imaging pixels in the image sensor 10a, and obtain a pair of parallax images (entire interpolated A image and B image) having a resolution higher than the reading resolution at each frame. In addition, this embodiment can precisely calculate a defocus amount by using the pair of parallax images.

FIGS. 5A to 5D illustrate independent reading of the partial A image with a unit of one partial reading column for each frame for simple description purposes, but a plurality of partial reading columns may be set to a unit for each frame. For example, FIGS. 8A to 8D illustrate two partial reading column are set to the unit for each frame. A luminance image can be generated from two columns of data and the frame interpolated image of the luminance image may be generated for a correlation calculation. In other words, when one column is set to the unit for the partial reading column, color filters on the imaging pixels are different between the odd and even columns and thus the defocus amount may be less precisely calculated due to the color of the object. The partial reading with the unit of two columns enables pixel values of green (G), red (R), and blue (B) to be obtained at the same time among the adjacent columns, and thus can generate the luminance. Hence, in comparison with the unit column number of one column, the unit column number of two columns can improve the robustness for the defocus amount calculating precision due to the color of the object.

Second Embodiment

A description will be given of a second embodiment according to the present invention. The first embodiment generates a pair of frame interpolated images (parallax images) in which the partial A image and the partial B image acquired by changing the partial reading column in the plurality of frames are written, then performs a correlation calculation between the pair of frame interpolated images, and calculates the correlation value. On the other hand, this embodiment performs a correlation calculation between the partial A image and the partial B image acquired for each frame, and calculates an image shift amount by adding the correlation calculation between the partial A image and the partial B image in the mutually different partial reading columns acquired in the plurality of frames. In other words, the second embodiment generates the plurality of partial A images (first image signals) and the plurality of partial B images (second image signals) without generating any frame interpolated images. Since the configuration of the digital camera is the same as that of the first embodiment, common components or components having similar functions will be designated by the same reference numerals as those of the first embodiment.

Figure 9:
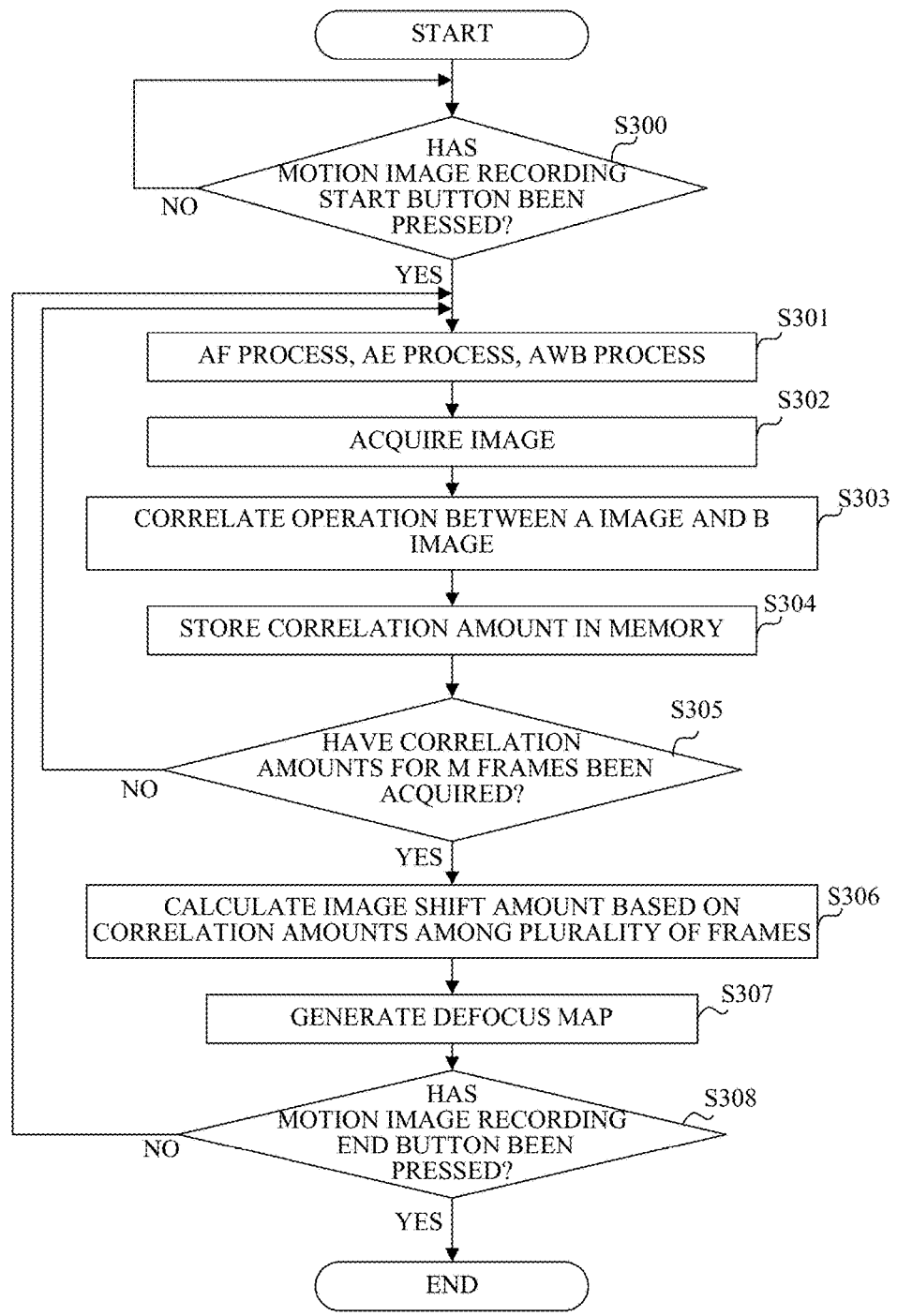
FIG. 9 is a flowchart illustrating a defocus amount calculation process according to a second embodiment of the present invention.

FIG. 9 describes a flow of the process executed by the system controller 20 to the focus detection process executed by the image processor 30. Each of the system controller 20 and the image processor 30 executes this process in accordance with the focus detection program contained in the system control program and the image processing program.

The process of the steps S300 to S302 in FIG. 9 are similar to the steps S100 to S102 in FIG. 3 according to the first embodiment, and a description thereof will be omitted. The process of the steps S307 and S308 in FIG. 9 are similar to the steps S109 and S110 in FIG. 3 according to the first embodiment, and a description thereof will be omitted.

Even this embodiment subtracts the partial A image obtained through the independent reading from the partial reading column from the partial A+B image in the partial reading column among the entire A+B image obtained through the addition reading from all imaging pixels in the image sensor 10a. Thereby, the partial B image paired with the partial A image is obtained (step S302).

Figure 10:
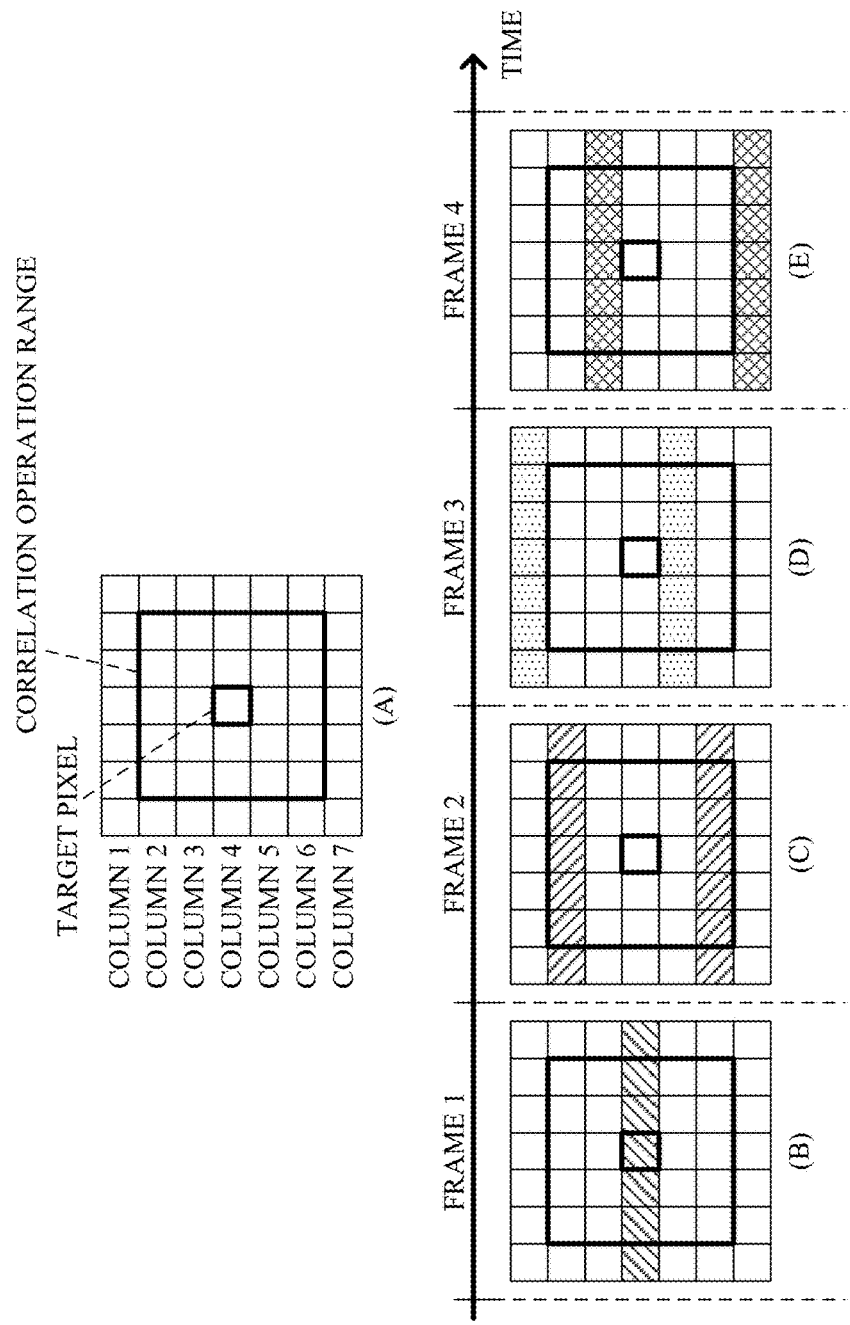
FIG. 10 is a view illustrating a partially read image area among a plurality of frames according to the second embodiment.

This embodiment sets a 5 columns (column 2 to column 6 from the top)×5 rows correlation calculation area contained in the center of the target pixel used to calculate the correlation value, as illustrated in FIG. 10A, and uses the surrounding pixels other than the target pixel, contained in this correlation calculation area, to calculate the correlation value of the target value. This configuration can reduce the influence of noises etc., and improve the robustness of the correlation calculation.

In the step S303 in FIG. 9, the image processor 30 performs the correlation calculation between the partial A image and the partial B image paired with the partial A image, which are acquired through independent reading in the step S302. As illustrated in FIGS. 10B to 10E, only the partial reading column for the independent reading is used for the correlation calculation. The partial A image and the partial B image acquired at column 4 as a partial reading column are correlated with each other at frame 1 illustrated in FIG. 10B. The partial A image and the partial B image acquired at columns 2 and 6 and at columns 5 and 3 are correlated with each other at frames 2, 3, and 4 illustrated in FIGS. 10C, 10D, and 10E.

Next, in the step S304, the image processor 30 stores the correlation value calculated in the step S303 in the memory 50.

Next, in the step S305, the image processor determines whether the correlation value is completely acquired for the plurality of frames (four frames in this embodiment) in one period for the correlation calculation between the partial A image and the partial B image in all partial reading columns. When it is completed, the flow moves to the step S306, and when it is not completed, the flow returns to the S301 so as to obtain the partial A image and the partial B image in the next frame.

In the step S306, the image processor 30 reads the correlation value for the plurality of frames for one period from the memory 50 and calculates the addition correlation value by adding the correlation values to one another for the plurality of read frames. The image processor 30 calculates the image shift amount from the addition correlation value. Then, the flow moves to the step S307.

Figure 11:
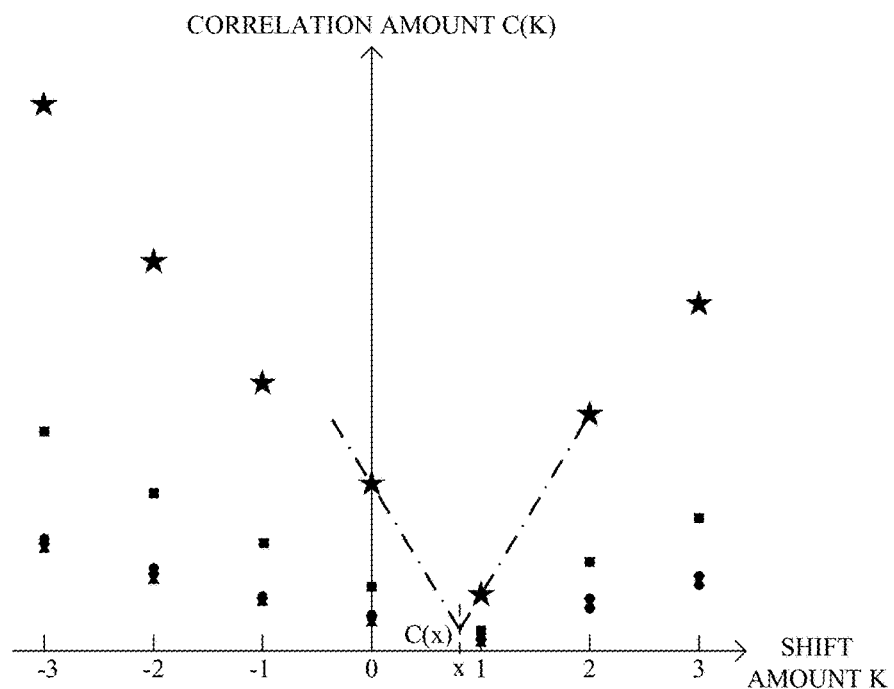
FIG. 11 is a view of an illustrative correlation value made by summing up correlation values for respective frames according to the second embodiment.

FIG. 11 illustrates a comparison example between the correlation value obtained in each frame in the plurality of frames in one period and the addition correlation value obtained by adding the correlation values to one another in the plurality of frames. The frame number in FIG. 11 corresponds to that in FIG. 10. It is understood from FIG. 11 that the process of this embodiment can provide the addition correlation value equivalent with the correlation value obtained by the correlation calculation between the pair of frame interpolated images in the first embodiment.

Third Embodiment

Next follows a description of a third embodiment according to the present invention. Similar to the first embodiment, even this embodiment calculates the correlation value through the correlation calculation between the pair of frame interpolated images (parallax images) in which the partial A image and the partial B image are written obtained by changing the partial reading column in the plurality of frames. This embodiment provides a weighted correlation calculation depending on a time period from when the frame image is acquired ("frame acquisition time" hereinafter) to when the correlation calculation is performed ("correlation calculation time" hereinafter) and the existence of the moving object or body. Since the configuration of the digital camera is the same as that of the first embodiment, common components or components having similar functions will be designated by the same reference numerals as those in the first embodiment.

Figure 12:
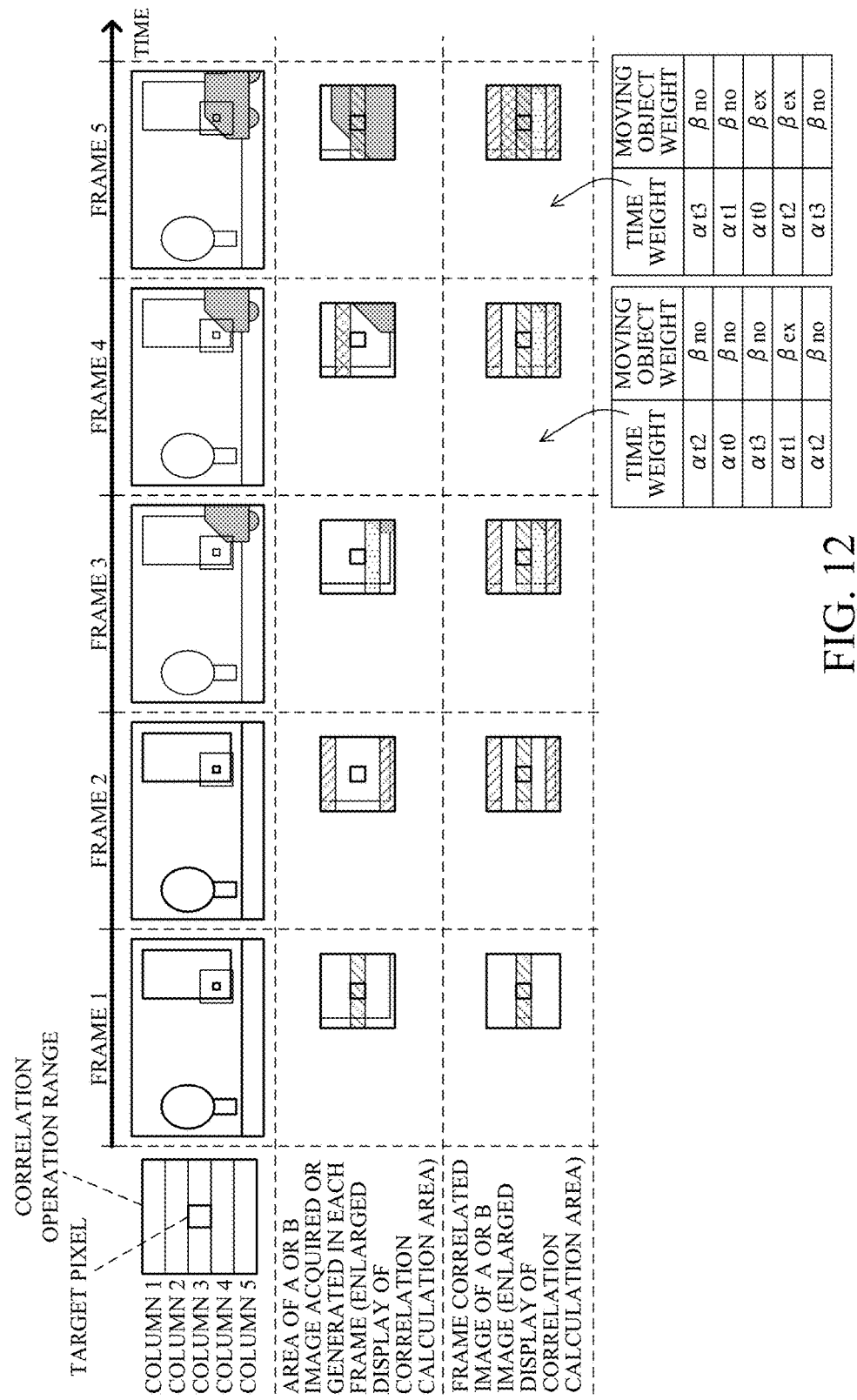
FIG. 12 is a view of illustrative partially read image area among a plurality of frames and weights used for correlation calculations according to a third embodiment.

FIG. 12 illustrates frame images from frame 1 to frame 5, and an enlarged pixel area that contains five partial reading columns for the independent reading of the partial A image (and the partial B image) in each frame image. FIG. 12 illustrates an enlarged correlation calculation area corresponding to the pixel area that contains the five partial reading columns among the frame interpolated images generated at frames 1 to 5. FIG. 12 illustrates a write area in the partial reading column or corresponding frame interpolated image with bevel, dot, or mesh hatching, and the hatching type is different for each frame.

This embodiment calculates the correlation value between the pair of frame interpolated images using a weighted correlation calculation expression of the following expression (7) instead of the expression (1) described in the first embodiment.

$$C_\gamma(k) = \Sigma \gamma_n |A_n - B_{n+k}| \quad (7)$$

In the expression (7), $\gamma_n$ is a weight corresponding $A_n$ and $B_n$ in the expression (1). This weight $\gamma_n$ is calculated, as illustrated in the following expression (8), by multiplying $\alpha_p$ by $\beta_q$, where $\alpha_p$ is a weight (referred to as a "time weight" hereinafter) according to the time period from the frame acquisition time to the correlation calculation time, and $\beta_q$ is a weight depending on the existence of the moving object (referred to as a "moving object weight" hereinafter).

$$\gamma_n = \alpha_p \times \beta_q \quad (8)$$

Assume that p=t0, t1, t2, t3, where t0 is the latest acquisition frame in generating the frame interpolated image in the four frames, t1 is a frame one frame before t0, t2 is a frame two frames before t0, and t3 is a frame three frames before t0. Then, the time weight $\alpha_p$ satisfies $\alpha_{t0} \geq \alpha_{t1} \geq \alpha_{t2} \geq \alpha_{t3}$. As the frame is older or a time length from the frame acquisition time to the correlation calculation time is longer, the applied time weight $\alpha_p$ becomes smaller. In other words, as the frame is newer or a time length from the frame acquisition time to the correlation calculation time is shorter, the applied time weight $\alpha_p$ becomes larger.

For example, in frame 4 illustrated in FIG. 12, $\alpha_{t0}$ is a time weight in column 2 $\alpha_{t1}$ is a time weight in column 4, $\alpha_{t2}$ is a time weight in columns 1 and 5, and $\alpha_{t3}$ is a time weight in column 3. In addition, in frame 5, $\alpha_{t0}$ is a time weight in column 3, $\alpha_{t1}$ is a time weight in column 2, $\alpha_{t2}$ is a time weight in column 4, and $\alpha_{t3}$ is a time weight in columns 1 and 5.

For the moving object weight $\beta_q$, q=no, ex, $\beta_{no}$ is a weight applied when there is no moving object, and $\beta_{ex}$ is a weight applied when there is a moving object. When the target pixel is not a pixel representing the moving object (referred to as a "moving object pixel" hereinafter), a weight is applied to the surrounding pixel in the correlation calculation area so as to satisfy $\beta_{no} > \beta_{ex}$. In other words, when the target pixel is not the moving object pixel, the moving object weight $\beta_{ex}$ for the surrounding pixel representing the moving object is made smaller than the moving object weight $\beta_{no}$ for the surrounding pixel that does not represent the moving object.

When the target pixel is a moving object pixel, the weight is applied to the surrounding pixel so as to satisfy $\beta_{ex} > \beta_{no}$. In other words, when the target pixel is the moving object pixel, the moving object weight $\beta_{ex}$ for the surrounding pixel representing the moving object is made larger than the moving object weight $\beta_{no}$ for the surrounding pixel that does not represent the moving object.

Herein, $\beta_q$ may be determined for each pixel or for each pixel column. When $\beta_q$ is determined for each pixel column, the moving object weight applied to the pixel column may be set to $\beta_{ex}$ where the number of moving object pixels contained in the pixel column exceeds a threshold, such as a half value of the number of all pixels in the pixel column. FIG. 12 illustrates an example in which $\beta_q$ is determined for each pixel column.

Thus, when the moving object weight is applied, the target pixel is not the moving object pixel in frame 4 in FIG. 12 and thus the correlation calculation is performed by reducing the weight in column 4 in which the moving object exists. Hence, the influence of the moving object that causes an error in the correlation calculation can be reduced. Since the target pixel is the moving object pixel in frame 5 in FIG. 12, the weights for the columns 3 and 4 in which the moving object exists are increased and the correlation calculation is performed. This configuration can increase the influence of the moving object on the correlation calculation, and calculate the defocus amount near the defocus amount of the moving object.

When the target pixel is the moving object pixel, as the moving amount of the moving object is larger, the moving object weight $\beta_{ex}$ for the surrounding pixel representing the moving object may be made larger. When the target pixel is not the moving object pixel, as the moving amount of the moving object is larger, the moving object weight $\beta_{ex}$ for the surrounding pixel representing the moving object may be made smaller.

When the time weight is applied, the correlation calculation properly using the surrounding pixel of the target pixel reduces the influence of the noise etc. to the correlation calculation, improves the robustness of the correlation calculation, and calculates the defocus amount that reflects the latest object state.

This embodiment applies a weight to the correlation calculation between the frame interpolated images. On the other hand, a similar weight may be applied where the correlation value calculated in each of the plurality of frames illustrated in the second embodiment is added so as to calculate the addition correlation value. In other words, an effect similar to that of this embodiment can be obtained after a weight is applied to the correlation value in each of the plurality of frames.

Fourth Embodiment

Next follows a description of a fourth embodiment according to the present invention. Similar to the first embodiment, this embodiment calculates the correlation values through a correlation calculation between the pair of frame interpolated images (parallax images) in which the partial A image and the partial B image are written which are acquired by changing the partial reading column in the plurality of frames. When the vibration detector 80 detects a vibration of the digital camera caused by a hand vibration, this embodiment performs a correlation calculation weighted according to the vibration magnitude (referred to as a "camera vibration amount" hereinafter). Since the configuration of the digital camera is the same as that of the first embodiment, common components or components having similar functions will be designated by the same reference numerals as those in the first embodiment.

Figure 13:
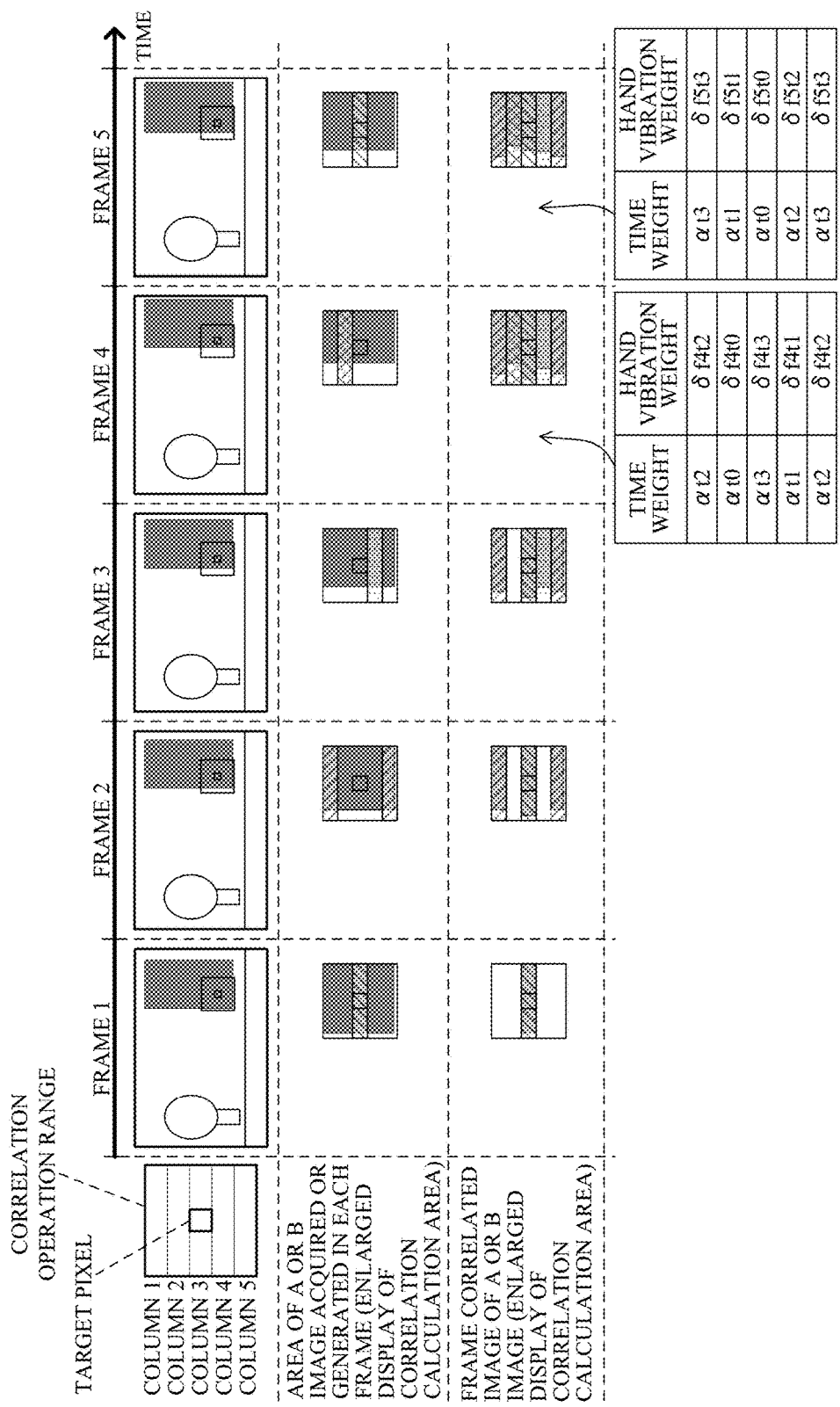
FIG. 13 is a view of illustrative partially read image area among a plurality of frames and weights used for correlation calculations according to a fourth embodiment.

FIG. 13 illustrates frame images from frame 1 to frame 5, and an enlarged pixel area that contains five partial reading columns for the independent reading of the partial A image (and the partial B image) in each frame image. FIG. 13 illustrates an enlarged correlation calculation area corresponding to the pixel area that contains the five partial reading columns among the frame interpolated images generated at frames 1 to 5. FIG. 13 illustrates a write area in the partial reading column or corresponding frame interpolated image with bevel, dot, or mesh hatching, and a hatching type is different for each frame.

This embodiment calculates the correlation value between the pair of frame interpolated images using the weighted correlation calculation expression as the expression (7) described in the third embodiment. The weight $\gamma_n$ in the expression (7) (weight corresponding to $A_n$ and $B_n$) in this embodiment is calculated, as illustrated in the following expression (9), by multiplying the time weight $\alpha_p$ by the weight (referred to as a "vibration weight" hereinafter) $\delta_s$ according to the camera vibration amount.

$$\gamma_n = \alpha_p \times \delta_s \qquad (9)$$

The time weight $\alpha_p$ is a weight described in the third embodiment. The vibration weight $\delta_s$ is a weight depending on a shift amount (referred to as a "image vibration amount" hereinafter) between the frame images calculated from a difference of a camera vibration amount between a reference frame and another frame when the reference frame is set to the latest acquisition frame in generating the frame interpolated image in the plurality of frames. A subscript "s" in $\delta_s$ is, for example, f4t1 and f5t2, where f4 and f5 represent the frame number in generating the frame interpolated image. In addition, t1 and t2 identify how many frames it is before the reference frame, t1 represents one frame before the reference frame, and t2 represents two frames before the reference frame.

This embodiment sets a smaller value for the vibration weight $\delta_s$ as the camera vibration amount is larger. The vibration weight example will be described with reference to FIG. 13. FIG. 13 illustrates the camera vibration only in the horizontal direction so as to simplify the description. The camera vibration and the image vibration amount have the same ratio. In FIG. 13, a vibration weight is applied so as to satisfy $\delta_{f4t0} \geq \delta_{f4t1} \geq \delta_{f4t2} \geq \delta_{f4t3}$ in frame 4, and a vibration weight is applied so as to satisfy $\delta_{f5t0} \geq \delta_{f5t1} \geq \delta_{f5t2} \geq \delta_{f5t3}$ in frame 5.

The vibration weight can reduce the influence on the correlation calculation of the camera vibration caused by the hand vibration. Similar to the third embodiment, the time weight can provide the correlation calculation properly using the surrounding pixel of the target pixel. This configuration can reduce the influence of the noise etc. on the correlation calculation, improve the robustness of the correlation calculation, and calculate the defocus amount that more precisely reflects the latest object state.

This embodiment applies a weight to the correlation calculation between the frame interpolated images. On the other hand, a weight can be similarly applied to the calculation of the addition correlation value by adding the correlation value calculated in each of the plurality of frames illustrated in the second embodiment. In other words, when each correlation value is weighted in the plurality of frames and summed up, the effect similar to that of this embodiment can be obtained.

The weight $\gamma_n$ in the expression (7) may be calculated with an expression (10) by considering the frame acquisition time, the existence of the moving object, and the camera vibration amount.

$$\gamma_n = \alpha_p \times \beta_q \times \delta_s \qquad (10)$$

In other words, $\gamma_n$ may be calculated by multiplying the time weight $\alpha_p$, the moving object weight $\beta_q$, and the vibration weight $\delta_s$ by one another.

Each embodiment acquires the A image and the B image using the image sensor that includes one micro lens and a plurality of photoelectric converters in each imaging pixel. The focus detection process described in each embodiment may be applied to a so-called multi-eye image capturing apparatus that includes a plurality of image capturing optical systems and a plurality of corresponding image sensors (or one image sensor having a plurality of image capturing areas). When the focus detection process is applied to the multi-eye image capturing apparatus, a large read data amount may decrease the processing speed when using all data. Thus, when a pair of frame interpolated images are generated using appropriate partial data, the processing speed can be maintained and the effect equivalent with that of each embodiment can be obtained by calculating an image shift amount.

When the electronic zoom is used for image capturing to obtain an enlarged image by narrowing a cut area in image data generated by the image capturing, the partial A image and the partial B image may be acquired only from the imaging pixel area on the image sensor corresponding to the cut area. This configuration can reduce the number of frames for one period necessary to acquire the partial A image and the partial B image among all imaging pixels in the narrow imaging pixel area. This configuration can obtain the frame interpolated image described in the first, third and fourth embodiments or the addition correlation value described in the second embodiment or can shorten a time period necessary to calculate the defocus amount and the image shift amount.

Each of the above embodiments can reduce a time period for the signal reading necessary to calculate the defocus amount and precisely calculate a defocus amount, in the image capturing apparatus that provides independent reading and addition reading from the first and second photoelectric converters.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-005470, filed on Jan. 14, 2016, which is hereby incorporated by reference herein in its entirety.

What is claimed is:

1. An image processing apparatus configured to process image obtained by an image capturing apparatus,
wherein the image, capturing apparatus includes:
a plurality of first photoelectric converters and a plurality of second photoelectric converters, which form a plurality of paired first and second photoelectric converters each providing a parallax; and
a signal reading unit configured to read, from each of the paired first and second photoelectric converters, a first output signal of the first photoelectric converter and a second output signal as a combined output signal of the first and second photoelectric converters, and
wherein the image processing apparatus comprises:
one or more processors serve as an image signal generating unit and a defocus amount calculating unit,
wherein the image signal generating unit is configured to:
set a specific photoelectric converter group including multiple paired first and second photoelectric converters that are part of the plurality of paired first and second photoelectric converters; and
generate (a) a first image signal using the first output signals read from the specific photoelectric converter group and (b) a second image signal using the first and second output signals read from the specific photoelectric converter group, and
the defocus amount calculating unit is configured to perform a correlation calculation on the first and second image signals to calculate a defocus amount,
wherein the image signal generating unit sequentially sets mutually different specific photoelectric converter groups and generates the first and second image signals from each of the mutually different specific photoelectric converter groups to provide a plurality of sets of the first and second image signals, and
the defocus amount calculating unit calculates one defocus amount using the plurality of sets of the first and second image signals.

2. The image processing apparatus according to claim 1, wherein the image signal generating unit sets the mutually different specific photoelectric converter groups in respective frames.

3. The image processing apparatus according to claim 1, wherein the defocus amount calculating unit generates a third image signal as a set of the first image signals of the plurality of sets of the first and second image signals, and a fourth image signal as a set of the second image signals of the plurality of sets of the first and second image signals, and wherein the defocus amount calculating unit performs the correlation calculation on the third and fourth image signals to calculate the one defocus amount.

4. The image processing apparatus according to claim 3, wherein the third image signal and the fourth image signal correspond respectively to a single image obtained by the first output signals from the plurality of first photoelectric converters and a single image obtained by output signals from the plurality of second photoelectric converters.

5. The image processing apparatus according to claim 1, wherein the defocus amount calculating unit calculates, by the correlation calculation, a correlation value between the first and second image signals of each set, adds together the correlation values of the plurality of sets of the first and second image signals to obtain an added correlation value, and calculates the one defocus amount using the added correlation value.

6. The image processing apparatus according to claim 1, wherein the defocus amount calculating unit calculates, by the correlation calculation, a correlation value between the first and second image signals, using a weight corresponding a time length from when the first and second image signals are generated from each of the specific photoelectric converter group to when the correlation calculation is performed, the weight having a larger value as the time length becomes shorter.

7. The image processing apparatus according to claim 1, wherein the one or more processors further serve as a moving object detecting unit configured to detect a moving object as the object from a plurality of frame images,
wherein the defocus amount calculating unit calculates, by the correlation calculation a correlation value between the first and second image signals, by weighting a surrounding pixel other than a correlation calculation target pixel in a correlation calculation area of each of the frame images depending on whether or not the target pixel represents the moving object,
wherein when the target pixel represents the moving object, the defocus amount calculating unit makes the weight for the surrounding pixel representing the moving object larger than that for the surrounding pixel that does not represent the moving object, and
wherein when the target pixel does not represent the moving object, the defocus amount calculating unit makes the weight for the surrounding pixel, representing the moving object smaller than that for the surrounding pixel that does not represent the moving object.

8. The image processing apparatus according to claim 7, wherein the defocus amount calculating unit makes larger the weight for the surrounding pixel that represents the moving object as a moving amount of the moving object becomes larger when the target pixel represents the moving object, and
wherein the defocus amount calculating unit makes the weight for the surrounding pixel that represents the moving object smaller as the moving amount becomes larger when the target pixel does not represent the moving object.

9. The image processing apparatus according to claim 1, wherein the defocus amount calculating unit acquires information of a vibration of the image capturing apparatus, and
wherein the defocus amount calculating unit calculates, by the correlation calculation, a correlation value between the first and second image signals using a weight depending on a magnitude of the vibration, and makes the weight smaller as the magnitude of the vibration becomes larger.

10. An image capturing apparatus comprising:
a plurality of first photoelectric converters and a plurality of second photoelectric converters, which form a plurality of paired first and second photoelectric converters each providing a parallax;
a signal reading unit configured to read, from each of the paired first and second photoelectric converters, a first output signal of the first photoelectric converter and a second output signal as a combined output signal of the first and second photoelectric converters; and
an image processing apparatus comprising one or more processors serving as an image signal generating unit and a defocus amount calculating
wherein the image signal generating unit is configured to:
set a specific photoelectric converter group including multiple paired first and second photoelectric converters that are part of the plurality of paired first and second photoelectric converters; and
generate (a) a first image signal using the first output signals read from the specific; photoelectric converter group and (b) a second image signal using the first and second output signals read from the specific photoelectric converter group, and
the defocus amount calculating unit is configured to perform a correlation calculation on the first and second image signal to calculate defocus amount,
wherein the image signal generating unit sequentially sets mutually different specific photoelectric converter group and generates the first and second image signals from each of the mutually different specific photoelectric converter groups to provide a plurality of sets of the first and second image signals, and
the defocus amount calculating unit calculates one defocus amount using the plurality of sets of the first and second image signals.

11. The image capturing apparatus according to claim 10, further comprising an image sensor that includes a plurality of imaging pixels, each of which includes one micro lens, the first photoelectric converter, and the second photoelectric converter.

12. A non-transitory computer-readable storage medium for storing an image processing program as a computer program that enables a computer to execute an image process, the computer being used for an image capturing apparatus that includes:
a plurality of first photoelectric converters and a plurality of second photoelectric converters, which form a plurality of paired first and second photoelectric converters each providing a parallax; and
a signal reading unit configured to read, from each of the paired first and second photoelectric converters, a first output signal of the first photoelectric converter and a second output signal as a combined output signal of the first and second photoelectric converters,
wherein the image process comprises an image signal generating step and a defocus amount calculating step,
wherein the image signal generating step:
sets a specific photoelectric converter group including multiple paired first and second photoelectric converters that are part of the plurality of paired first and second photoelectric converters; and
generates (a) a first image signal using the first output signals read from the specific photoelectric converter group and (b) a second images signal using the first and second output signals read from the specific photoelectric converter group, and the defocus amount calculating step performs a correlation calculation on the first and second image signals to calculate a defocus amount, wherein the image signal generating step sequentially sets mutually different specific photoelectric converter groups and generates the first and second image signals from each of the mutually different specific photoelectric converter groups to provide a plurality of sets of the first and second image signals and the defocus amount calculating step calculates one defocus amount using the plurality of sets of the first and second image signals.

* * * * *